United States Patent [19]

Rice

[11] Patent Number: 4,967,994
[45] Date of Patent: Nov. 6, 1990

[54] HOUSEHOLD APPLICANCE LIFTING AND STABILIZING SYSTEM

[76] Inventor: Richard M. Rice, 22708 Bermuda Way, Boca Raton, Fla. 33428

[21] Appl. No.: 352,887

[22] Filed: May 17, 1989

[51] Int. Cl.$^5$ ............................................. F16M 7/00
[52] U.S. Cl. ................................... 248/669; 248/910; 248/649
[58] Field of Search ............... 248/669, 649, 648, 651, 248/188.2, 354.6, 660, 910

[56] References Cited

U.S. PATENT DOCUMENTS

| | | | |
|---|---|---|---|
| 2,695,147 | 11/1954 | Castricone . | |
| 2,979,857 | 4/1961 | Longbotham | 248/649 X |
| 3,250,503 | 5/1966 | Karstens | 248/649 |
| 3,304,032 | 2/1967 | Yates | 248/649 |
| 4,182,506 | 1/1980 | Boveia | 248/656 |
| 4,625,424 | 12/1986 | de la Haye | 248/649 X |
| 4,669,696 | 6/1987 | Petta | 248/550 |

FOREIGN PATENT DOCUMENTS

| | | | |
|---|---|---|---|
| 0036969 | 4/1978 | Japan | 248/649 |
| 0045976 | 4/1979 | Japan | 248/669 |

Primary Examiner—Karen J. Chotkowski
Attorney, Agent, or Firm—T. M. Gernstein

[57] ABSTRACT

A lifting and stabilizing system is mounted on a household appliance and includes a lifting system to lift that appliance above a supporting surface, such as a floor so that access to that supporting surface beneath the appliance is provided. The stabilizing system includes a plurality of weighted door-like elements mounted on the appliance to slide from one position to a second position to lower the center of gravity of the weighted appliance. In one embodiment, the center of gravity of the weighted appliance is lowered beneath the supporting system whereby any forces tending to tip the elevated appliance are combined with the weight of the lifted appliance to form a force moment about the lifting elements that is directed to return the appliance to the proper, untipped position.

17 Claims, 2 Drawing Sheets

HOUSEHOLD APPLIANCE LIFTING AND STABILIZING SYSTEM

TECHNICAL FIELD OF THE INVENTION

The present invention relates to the general field of supports, and to the particular field of lifting heavy household equipment, such as refrigerators, washers, dryers, and the like. Specifically, the present invention relates to lifting such equipment in a stable manner.

BACKGROUND OF THE INVENTION

Many household appliances are quite heavy and thus are difficult to move to allow the floor beneath such equipment to be adequately cleaned. For example, many homes have refrigerators, clothes dryers, washing machines and the like that are only rarely, if ever, moved to permit the floor beneath such appliance to be cleaned.

While the lifting art has proposed several designs for leveling appliances, see, e.g., U.S. Pat. No. 2,695,147, 4,182,506 and the like, such leveling devices are not suitable for eleVating such appliances high enough to permit the floor beneath such appliance to be fully cleaned. These leveling devices are designed to move an appliance only small amounts to keep it level.

Leveling and lifting are two different operations, and are subject to different considerations. The principal difference occurs because a leveling operation is concerned with elevating the appliance small amounts; whereas, a lifting operation elevates the appliance several times higher than a leveling operation. This increased height creates stability problems not present with the leveling operations.

To elucidate, a refrigerator, for example, lifted only an inch or so is still stable in the elevated position; however, the same refrigerator elevated five or six inches is not nearly so stable. For safety reasons it is imperative that the elevated appliance be stable, yet to adequately clean under an appliance, such appliance must be elevated at least five or six inches.

Therefore, there is a need for a system for lifting a heavy household appliance high enough to permit the floor under such appliance to be cleaned, yet will maintain such elevated appliance in a stable, safe condition.

OBJECTS OF THE INVENTION

It is a main object of the present invention to provide a system that is capable of lifting a heavy household appliance high enough to clean beneath such appliance.

It is another object of the present invention to provide a system that will lift a heavy household appliance high enough to permit cleaning under such appliance, yet will do so in a manner that maintains such elevated appliance in a stable condition.

SUMMARY OF THE INVENTION

These, and other, objects of the present invention are achieved by a lifting system that keeps the center of gravity of the lifted appliance in essentially the same location as the center of gravity of the non-elevated appliance. The system also provides a floor-engaging support means.

In this manner, the lifting system maintains the elevated appliance stable since the location of the center of gravity of such appliance determines the stability of the appliance. In fact, the system, in one embodiment, includes elements that lower the center of gravity of the appliance to be located beneath the lifting mechanism elements whereby the appliance is totally prevented from tipping due to the moments that occur in a situation Where the center of gravity of the device is beneath the support means. Any tipping of the appliance will immediately set up a force moment that is in a direction opposite to the tipping, and thus tends to correct the tipping.

The lifting system also includes means for engaging the floor in a manner that does not interfere with the cleaning process, yet will provide further stability to the elevated appliance.

DETAILED DESCRIPTION OF THE PREFERRED EMBODIMENT OF THE INVENTION

Figure 1:
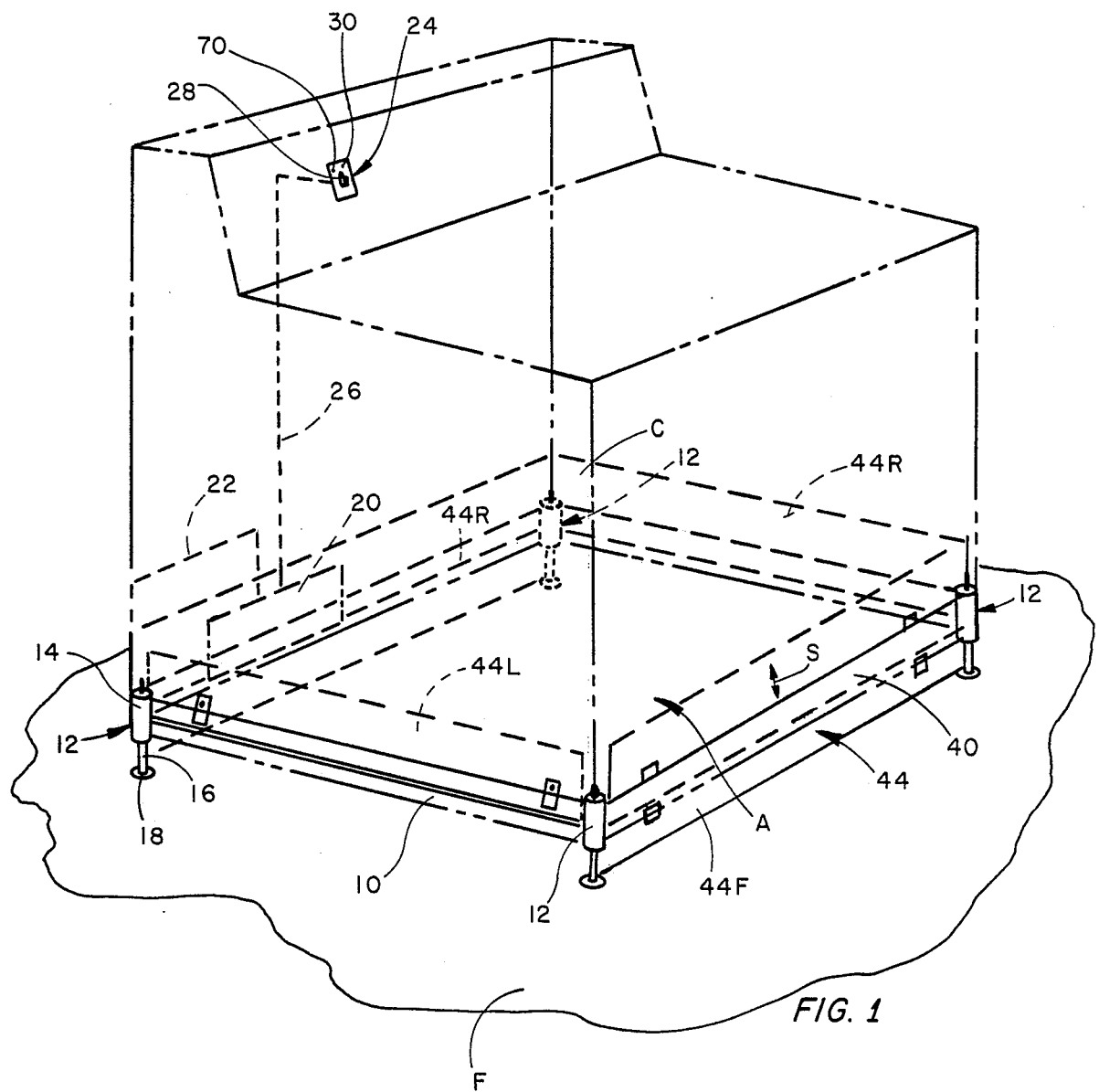
FIG. 1 is a perspective view of an appliance which includes a lifting system embodying the present invention.

Shown in double chain lines in FIG. 1 is a household appliance A, such as clothes Washer, a dryer or the like that can be quite heavy and difficult to move to permit cleaning of floor F beneath the appliance. The washer is shown for the sake of convenience, and no limitation is intended by such showing.

The appliance A, itself, includes a center of gravity C located generally near the center of that appliance, and is supported by a lifting system 10 that is located between the bottom of the appliance and the floor. This lifting system 10 is adapted to elevate the appliance A by as much as five or six inches. The center of gravity C will be located in a particular location when the appliance is in the floor engaging, unlifted condition. It is the object of the present invention to keep the center of gravity located in at least such position even when the appliance is elevated. Thus, for the purposes of this disclosure, it will be assumed that the location for the center of gravity C shown in FIG. 1 for an elevated appliance is at or very near the same location for the center of gravity for an unelevated appliance. In fact, as Will be discussed below, it is possible in one embodiment of the present invention for the center of gravity for the elevated appliance to actually drop from that location associated there with for an unelevated appliance that does not include the stabilizing system of the present invention.

Figure 2:
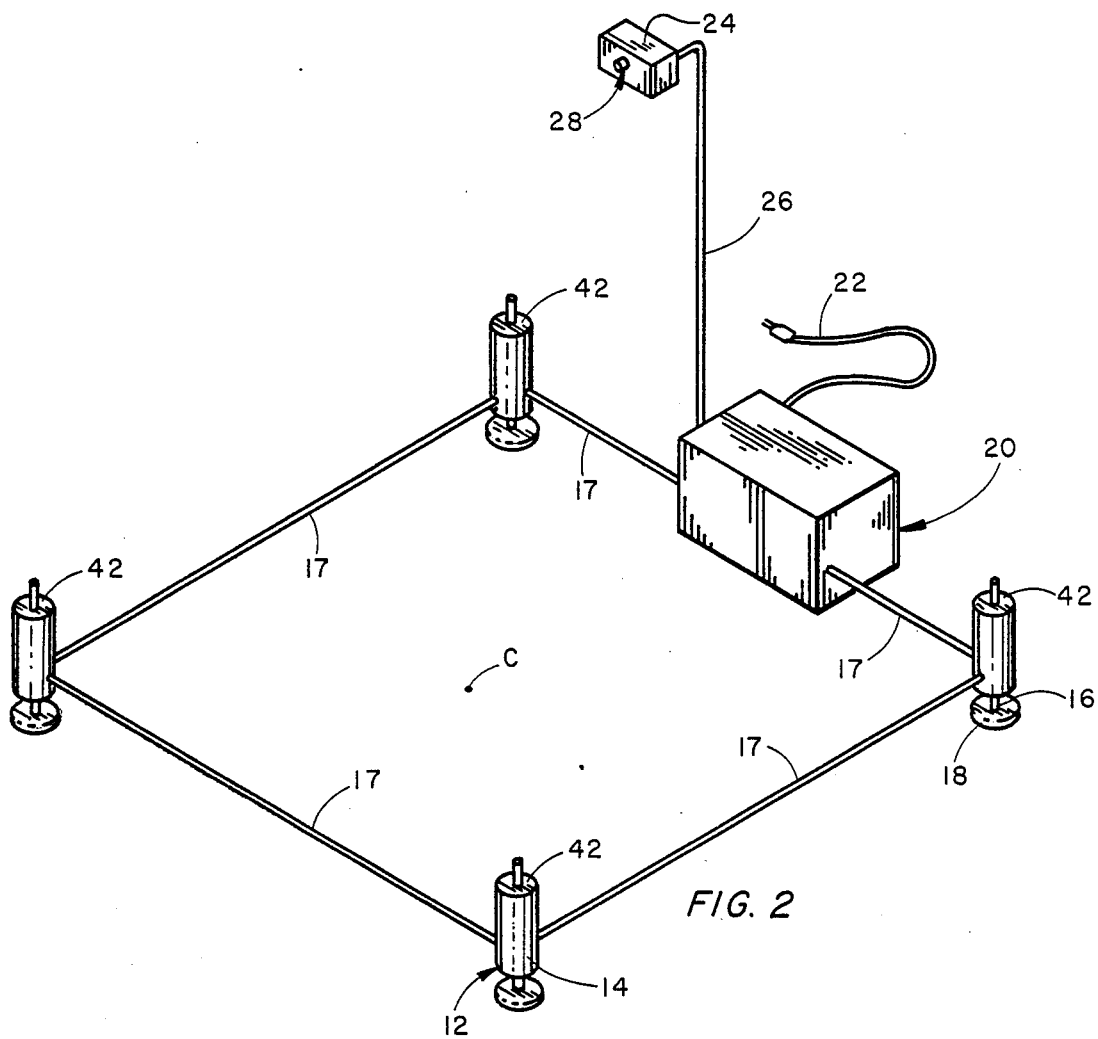
FIG. 2 is a perspective schematic showing the lifting system embodying the present invention.

As can be seen in FIGS. 1 and 2, the lifting system 10 includes a plurality of appliance lifting elements 12 mounting the appliance on the floor. Each of these lifting elements 12 includes a housing, such as housing 14, fixedly attached to the appliance in the manner of a leg, and an extendable element, such as extendable element 16, that is mounted in the housing to move into and out of that housing. The lifting elements 12 can be either pneumatic, mechanical, or electrical. For example, the lifting elements 12 can be hydraulic such as disclosed in U.S. Pat. No. 3,250,503, the disclosure of which is incorporated herein by reference, or can be mechanical such as disclosed in U.S. Pat. No. 4,669,696, the disclosure of which is incorporated herein by reference. The lines 17 connecting the lifting elements 12 together and to the motor thus can be fluid lines if the system is hydraulic or pneumatic, or mechanical rods that have appropriate gearing and pinions thereon if the system is mechanical, or electrical leads if the system is electrical. For example, if the system is mechanical, the lines 17 will include gears, such as conical gears or pinions on each end which engage appropriate gears or racks in the housings and which engage appropriate gears or pinions in a drive motor to drive the various lifting elements. Each of the housings thus will include appropriate racks or threaded members that engage rod-mounted gears or pinions to drive the extendable elements up and down. The housings can be rotatably attached to the threaded member to move up or down as that member rotates using appropriate co-operating threads on the housing and on the extendable member. In such a case, the extendable member really doesn't extend, but forces the housing up and down thereon as it rotates.

Each lifting element 12 further includes a foot pad, such as foot pad 18 connected to the extendable element 16 and abutting the floor F to support the appliance on the floor. The foot pads are large enough to securely support the appliance.

The lifting system 10 further includes means to operate and control the lifting elements 12. Such operating means includes a motor 20 mounted on the appliance at a low position and connected to a source of power by a cord 22. The motor can be either hydraulic, mechanical or electrical as dictated by the selection of the lifting elements, and being heavy will tend to lower the center of gravity C of the appliance if that motor is mounted in a low position on the appliance. The motor is controlled by a switch and control means 24 also mounted on the appliance and connected to the motor by a lead line 26.

The control means 24 includes an on/off switch 28 and lifting element control switches 30, the function of which will be evident from the ensuing discussion.

The lifting system 10 further includes an appliance stabilizing means 40 which functions to maintain the appliance center of gravity C in a stable location when the appliance is lifted, which is at least the location shown in FIG. 1, but can also be designed to lower and keep such center of gravity beneath a plane containing the top of the lifting element housings, such as housing tops 42 shown in FIG. 2, and indicated in FIG. 2 by C'.

The stabilizing means 40 includes a plurality of door-like elements 44 each slidably mounted to the appliance in a chamber 46 to move up and down relative to the appliance as indicated in FIG. 1 by arrow S. In the preferred embodiment, there are four identical door-like elements, each located on one side of the appliance. These elements can be operated independently of each other, but the preferred embodiment has elements on opposite sides of the appliance operating in pairs. For example, elements 44L and 44R are both in a raised condition in FIG. 1; whereas elements 44F and 44R are in the lowered condition in FIG. 1. This paired operation will permit the appliance to be elevated in a stable manner, but will also provide a clearance area through which a floor cleaning appliance, such as a vacuum cleaner head, or the like, can be inserted to clean beneath the appliance. In the just-described situation, the cleaner clearance areas are located adjacent to the door-like elements 44L and 44R since these are the elements that are raised. One skilled in the art Will recognize that any combination of the door-like elements can be used in the manner just described to provide any suitable clearance areas.

Since all of the stabilizing elements 44 are identical, only one will be described, it being understood that the description will be applicable to all of the elements 44.

Figure 3:
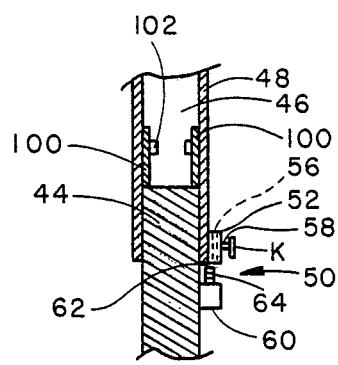
FIG. 3 is a cut-away view of a center of gravity lowering and floor engaging element used in the system of the present invention.

Referring to FIG. 3, it is seen that the element 44 includes a heavy door-like portion slidably located in a chamber 46 defined on the wall 48 of the appliance near the bottom of that wall. Each door-like element 44 can weigh as much as the entire doorless appliance or even more depending on how much the center of gravity is to be lowered. Those skilled in the art will understand how much each door-like element 44 is to weigh in order to locate the appliance center of gravity in the desired location. For example, if the center of gravity is in one location when the combined appliance and lifting system is considered with all of the elements 44 in the raised positions (elements 44L and 44R are in the raised position in FIG. 1), that center of gravity will move downward when the elements are lowered due to the weight of the elements, the change in shape and weight distribution of the combination, and the fact that some portion of the lowered elements is located beneath the tops 42 of the housings 12. Therefore, for example, if the center of gravity C is to remain in essentially an unelevated location even when the appliance is elevated, the door-like elements should each weigh approximately one-half of the total doorless appliance so that When two of the elements 44 are lowered, the center of gravity will remain relatively unchanged.

As discussed above, if the center of gravity is lowered to be below the tops of the housings, the moments established by the center of gravity and any tipping force will tend to return the appliance to the supported position thereby adding great stability to the elevated appliance. Locating the heavy motor 20 near the bottom of the appliance will contribute to this stability function of the system 10.

As will be apparent from the foregoing discussion, the appliance, itself, will have a center of gravity as determined by well-known methods: however, adding the heavy motor and heavy elements 44 will alter the location of this center of gravity for the overall combination of the appliance and the stabilizing system. Therefore, it is possible to actually lower the unelevated appliance center of gravity below the tops of the housings by adding enough weight to the door-like elements 44. Since it is assumed that an appliance Without the lifting system 10 will be stable, the center of gravity C shown in FIG. 1 can be the same as the location of the center of gravity for an appliance that does not include the lifting system. Thus, the center of gravity of a combination of the lifting system and the appliance can be the same as or be below that shown in FIG. 1. Such lowering of the appliance center of gravity will stabilize the appliance.

Each door-like element 44 is adapted to be moved independently of the others, and thus each element includes a latch means, such as latch means 50 shown in FIG. 3. The latch means 50 includes a keeper 52 fixedly mounted on the appliance wall 48 and a catch element 64 fixedly mounted on the door-like element 44. The keeper includes a chamber 56 and a projection 58 which is threadably mounted on the keeper housing to move transversely of the chamber 56 into and out of that chamber. A knob K is attached to the projection to turn that projection.

The catch element 54 includes a housing 60 fixedly mounted on the element 44 and a tongue 62 fixed to the housing 60 and extending upwardly therefrom in a position to move into the chamber 56 of the keeper 52. The tongue 62 includes a projection-receiving passage 64 that is located on the tongue to receive the projection 58 when the tongue is in the chamber 56 and the projection is threadably moved inward toward the element 44. The receipt of the projection 58 into the passage 64 will lock the element 44 to the appliance wall in the raised condition as indicated in FIG. 1 for elements 44L and 44R.

Unlocking the latches 50 will permit the elements to rest on the floor and to remain in such position as the appliance is elevated The appliance thus moves upwardly relative to the unlocked elements but the locked elements will move with the appliance. The latches and chambers 46 are designed so that when the appliance is in its lowered position, the latches will be engaged so that the heavy elements 44 need not be lifted to engage the latches. The latches associated with element 44F are shown in FIG. 1 in the open condition, While the latches associated With the element 44L are shown in the closed condition.

In the event that a user wishes to operated the individual lifting elements 12 in an individual manner, that is, operate each individual element 12 independently of the other elements, the control switches 30 can be used to control various circuits in the motor 20. One skilled in the art will understand how to design the appropriate circuitry, therefore, such circuitry will not be discussed. Individual control of the elements 12 can be used to further stabilize the elevated appliance, and will permit the system 10 to function as a leveling system as well as a lifting system.

As is best shown in FIG. 3, the elements 44 are each slidably affixed to the appliance wall 48 by slotted ears 100 on the element 44 and fasteners mounted on the wall 48, such as fastener 102. Each of the ears 100 includes an elongated slot through which the fastener is received and slides on that fastener. When the element 44 is in its fully lowered position, that element is pendently supported on the wall 48 by the fastener 102 engaging the ear 100 at the top of the slot. If the element 44 is sized to engage the floor, the size of the slot is adjusted so the ear engages the fastener as the lower edge of the element engages the floor. When the element 44 is sized as above discussed so that as it is pendently supported by the fasteners and ears, the center of gravity is at location C', as above discussed, the abovementioned anti-tipping moments are established in the elevated appliance. However, even if the center of gravity is above location C', the lowered nature thereof will ensure a stable appliance in the elevated position as above discussed.

The fasteners 102 can be threaded as shown in FIG. 3 so that they can be adjusted by a screwdriver or the like to be affixed to the ears if desired, such as when the elements are in the partially lowered position and it is desired to prevent further lowering thereof. Such a situation might occur if, for example, the appliance is only to be slightly elevated. Such affixing of the ears to the walls might also be desirable if it is desired to further ensure the stability of a fully elevated appliance.

It is to be understood that while certain forms of the present invention have been illustrated and described herein, it is not to be limited to the specific forms or arrangement of parts described and shown.

I claim:

1. A lifting system for use with heavy household appliances, such as automatic dishwashers, refrigerators, dryers and the like comprising:
    (A) a motor mounted on the appliance;
    (B) a control means on the appliance and connected to the motor;
    (C) a plurality of appliance lifting elements mounting the appliance on a support surface such as a floor or the like, each lifting element including
        (1) a housing having a housing top and being fixedly attached to the appliance near said housing top,
        (2) said housing top being located to be contained in a plane common to all of said housing tops,
        (3) an extendable element movably mounted to said housing to move into and out of said housing,
        (4) a foot pad connected to said extendable element and being in abutting appliance supporting contact with the support surface,
    (D) means connecting each appliance lifting element to said motor and to said control means so that said extendable element of each appliance lifting element can be moved into and out of the housing associated therewith to lower and lift the appliance respectively, and
    (E) appliance stabilizing means mounted on the appliance to stabilize the appliance when the appliance is lifted from the support surface, said stabilizing means including means for moving said stabilizing means from a first location having a part of said stabilizing means located above a plane containing the lifting element housing tops to a second location below the plane containing the lifting element housing tops.

2. The lifting system defined in claim 1 wherein said stabilizing means is located entirely above the plane containing the housing tops in said first location.

3. The lifting system defined in claim 2 wherein said appliance stabilizing means includes weighted means.

4. The lifting system defined in claim 3 wherein said weighted means includes a plurality of door-like elements mounted on the appliance and latch means on each door-like element for fixing said each door-like element to the appliance to move therewith.

5. The lifting system defined in claim 4 further including a chamber defined in the appliance to receive each door-like element, said door-like elements being mounted on the appliance to slide into and out of said chambers.

6. The lifting system defined in claim 5 wherein each door-like element includes a leading edge that is located to contact the supporting surface when said each door-like element is in said second location.

7. The lifting system defined in claim 6 wherein each door-like element is sized to weigh over one-half of the weight of the appliance.

8. The lifting system defined in claim 6 wherein each door-like element is sized to weigh essentially the same as the appliance.

9. The lifting system defined in claim 6 wherein the appliance includes a center of gravity, and the appliance having said stabilizing means has a second center of gravity, with said second center of gravity being located closer to the supporting surface than said appliance center of gravity.

10. The lifting system defined in claim 9 wherein said second center of gravity is located below the plane containing said housing tops.

11. The lifting system defined in claim 9 wherein said appliance having said stabilizing means in said second location has a third center of gravity, with said third center of gravity being located closer to the supporting surface than said second center of gravity.

12. The lifting system defined in claim 11 wherein said third center of gravity is located below the plane containing said housing tops.

13. The lifting system defined in claim 12 wherein said second center of gravity is located above the plane containing said housing tops.

14. The lifting system defined in claim 5 said door-like elements are connected together and to said control means to operate in pairs.

15. The lifting system defined in claim 14 wherein the appliance includes four sides, and one of said door-like elements is located on each side of said appliance, with pairs of door-like elements being formed by door-like elements on opposite sides of said appliance.

16. The lifting system defined in claim 3 further including slotted means slidably affixing said weighted means to said appliance.

17. The lifting system defined in claim 16 wherein said slotted means further includes a threaded fastener securely mounted on a wall of said appliance and a slotted ear securely mounted on said weighted means.

* * * * *